(Specimens.)
W. BOOTH.
ART OF MANUFACTURING ARTICLES FROM WOOD PULP.
No. 420,763. Patented Feb. 4, 1890.
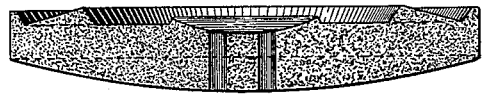
WITNESSES:
INVENTOR:

United States Patent Office.

WILLIAM BOOTH, OF LEOMINSTER, MASSACHUSETTS.

ART OF MANUFACTURING ARTICLES FROM WOOD PULP.

SPECIFICATION forming part of Letters Patent No. 420,763, dated February 4, 1890.

Application filed August 19, 1889. Serial No. 321,253. (Specimens.)

*To all whom it may concern:*

Be it known that I, WILLIAM BOOTH, of Leominster, in the county of Worcester and State of Massachusetts, have invented certain new and useful Improvements in Art of Manufacturing Articles from Wood Pulp, of which the following is a specification.

It is the object of my invention to produce such improvement in the art of manufacturing various articles from wood pulp as will result in a superior product.

Heretofore in the production of articles of manufacture from wood pulp it has been common to take the material as received from the pulp-mill and give it its initial form by molding or slightly compressing it into a shape resembling the form that is to be finally given thereto. Such initially-formed article having been dried is subjected to the coloring and indurating "pickle," so called, after which it is compressed into desired shape. Objections arise in this mode of procedure in that there are lumps or particles in the mass treated that do not or will not absorb the indurating and coloring pickle, so that when final molding or form is given to the article the unindurated portions or parts will crumble or break away from the portions that may have been subjected to the pickle. I have discovered that by regrinding and intermixing the pulp after treatment in the pickle the mass will become thoroughly and uniformly indurated, and that various articles of manufacture composed of completely hardened and cohesive particles may be readily made therefrom.

The drawing hereto annexed and forming a part of this specification represents a sectional view of a button, drawn to an enlarged scale, made in accordance with my invention, though practically numberless other articles may be produced by my mode of procedure and which may embody my improvements.

In carrying out my invention I take the wood pulp in the form that it is received from the pulp-mill, and after first fully drying it or not, as circumstances may require, I subject it to the "indurating-pickle," so called, which pickle may or may not contain coloring-matter, as desired, and may consist of any compound or solution suited to effect an induration of the mass, after which the material is taken out of the pickle and thoroughly dried, when it is run through a mill and ground sufficiently fine to insure a mixture of such particles as had not absorbed the indurating-pickle or become thoroughly saturated therewith, with the fully treated and hardened particles. I finally take this powdered pulp so produced and place and compress the same, with the application of heat, in a suitable mold or die, with the result of producing an article of manufacture composed of a homogeneous and cohesive mass of thoroughly-indurated particles. The articles thus produced may be polished or japanned, if desired, though for most purposes such treatment will not be necessary.

By my invention I am enabled to produce many useful articles of manufacture—such, for example, as insulating and operating devices for electrical appliances, hand-wheels for the operation of valves of steam and heating contrivances, buttons, door-knobs, &c.

Having thus explained the nature of my invention and described a way in which the same may be carried out or practiced, I declare that what I claim is—

The improvement in the art of producing articles of manufacture from wood pulp, which consists in subjecting the mass to indurating-pickle, then drying the same, then grinding it into a powder and intermixing the particles, and then compressing the ground product into desired form, as set forth.

In testimony whereof I have signed my name to this specification, in the presence of two subscribing witnesses, this 15th day of August, 1889.

WILLIAM BOOTH.

Witnesses:
ARTHUR W. CROSSLEY,
W. C. RAMSAY.